(12) United States Patent
O'Neill et al.

(10) Patent No.: US 7,587,084 B1
(45) Date of Patent: Sep. 8, 2009

(54) DETECTION OF ANTI ALIASING IN TWO-COLOR IMAGES FOR IMPROVED COMPRESSION

(75) Inventors: Thomas G. O'Neill, Mountain View, CA (US); Richard G. Fell, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 760 days.

(21) Appl. No.: 10/892,614

(22) Filed: Jul. 15, 2004

(51) Int. Cl.
*G06K 9/00* (2006.01)
*G06K 9/36* (2006.01)

(52) U.S. Cl. .................. 382/162; 382/166; 382/232; 382/233

(58) Field of Classification Search .............. 382/162, 382/233, 270, 272–275; 358/523; 345/611
See application file for complete search history.

(56) References Cited

U.S. PATENT DOCUMENTS

| | | | |
|---|---|---|---|
| 5,086,439 A | 2/1992 | Asai et al. ................ 375/122 |
| 5,606,940 A | 3/1997 | Shafer et al. ............. 123/90.12 |
| 5,684,895 A | 11/1997 | Harrington ................ 382/233 |
| 5,793,381 A | 8/1998 | Edberg et al. ............. 345/467 |
| 5,844,508 A | 12/1998 | Murashita et al. ........... 341/51 |
| 6,034,700 A | 3/2000 | Rumph et al. |
| 6,501,856 B2 | 12/2002 | Kuwano et al. ............ 382/194 |
| 6,522,330 B2 | 2/2003 | Kobayashi ................ 345/467 |
| 6,574,364 B1 | 6/2003 | Economidis et al. |
| 6,842,541 B2 | 1/2005 | Curry ..................... 382/270 |
| 7,109,997 B1 | 9/2006 | Callahan et al. |
| 2004/0135790 A1 | 7/2004 | Moore .................... 345/589 |
| 2004/0208366 A1 | 10/2004 | Kuwata ................... 382/171 |
| 2006/0133690 A1 | 6/2006 | Bloomberg et al. |

*Primary Examiner*—Duy M Dang
(74) *Attorney, Agent, or Firm*—Gunnison, McKay & Hodgson, L.L.P.; Philip J. McKay

(57) ABSTRACT

A method for identifying anti aliased images of two or three colors makes use of the fact that in most anti-aliasing techniques, the color values of the source images are known with sub-pixel accuracy, e.g., the boundaries of text characters are described with arbitrary high precision and averaging ensures that the destination pixel values are interpolations of the two source colors so that all of the color values of the image lie on a single line, or a single plane, in 3-dimensional color space.

12 Claims, 8 Drawing Sheets

DETECTION OF ANTI ALIASING IN TWO-COLOR IMAGES FOR IMPROVED COMPRESSION

FIELD OF THE INVENTION

The present invention relates generally to compression of video images and, in particular, to detecting images that have been subjected to anti-aliasing.

BACKGROUND OF THE INVENTION

The rise of multimedia computing appliances and digital video transmission has led to an increased need to store and manipulate many-colored and complex digital images. Examples of many-colored and complex digital images include: digital photographic images of the natural world, whether taken with a digital camera or digitized from an analog camera print; computer-generated images of the natural world; and/or computer-generated images which include anti-aliased text or graphics.

Anti-aliased images, in particular, are increasing in both frequency of occurrence and importance in the art. This is primarily due to the increased expectations regarding visual appearance of the user interface in word processing and other text and/or graphic orientated programs. Anti-aliasing is a technique well known to those of skill in the art whereby the edges of an image are blurred or "softened" to reduce the visual artifacts produced by finite pixel sizes.

Due to the complexity of many-colored digital images, it is often necessary to compress the images in order to save storage space and/or minimize bandwidth when storing or transmitting the digital images. The compression/decompression process typically uses standardized algorithms well known to those of skill in the art. The algorithms for compressing and decompressing the images are known generically as COmpressor/DECompressors or "codecs".

Codecs are typically grouped into two main types; lossless and lossy. Lossless codecs, like LZ coding and GIF, preserve the image information in its exact form. While providing virtually perfect image replication capabilities, lossless codecs tend to provide less compression opportunities and require more resources, such as storage space and transmission bandwidth, to employ. On the other hand, lossy codecs, such as JPEG and vector quantization, store only an approximate representation of the image. Lossy codecs are typically formulated based on the capabilities and limitations of the human visual system to detect subtle differences in color. In other words, granularity and detail beyond that capable of being detected by the human eye are disregarded and do not survive the compression process. Since, using lossy codecs, digital information is selectively discarded, lossy codecs typically achieve much better compression than lossless codecs while still maintaining acceptable quality.

In addition to the true multi-colored images needing to be transmitted, many anti-aliased images of only two or three base colors are also treated as many colored images by traditional encoding mechanisms. This is because while many anti-aliased images, such as those resulting from anti-aliasing two or three color text images or designs, have a low inherent information content, i.e., two or three base colors with shading variations thereof, the images appear to traditional encoding mechanisms as many colored images with a complexity similar to that of a natural image.

For instance, an anti-aliased text image may contain base colors of black and white, with all other color variations being shades of gray. Consequently, during compression, all that is needed is the information that all pixel values are a shade of gray, and the shade value for each pixel. However, in the prior art, each pixel was treated as a new color being one of $256^3$ possibilities, requiring three bytes of data per pixel. Consequently, in the prior art, for a given degree of lossiness, the encoder often obtained the same, or even worse, compression for an anti-aliased image as it would for a true many color natural image.

What is needed is a method of identifying anti aliased images so the anti-aliased images can be more efficiently compressed than was possible using prior art methods and encoders.

SUMMARY OF THE INVENTION

The present invention provides a mechanism for identifying anti-aliased images of two or three colors. The present invention is particularly useful in situations where a source of one of more RGB images is unknown.

One embodiment of the present invention makes use of the fact that in most anti-aliasing techniques, the base color values of the source images are known with sub-pixel accuracy, e.g., the boundaries of text characters are described with arbitrary high precision. Typically, the value for a given pixel in the destination image is given by a position-weighted average of image colors in the source image, with source areas near the pixel's coordinates being given extra weight. The weighted average produces the desired blurring or "softening" effect discussed above.

For a two-color source image such as text, the averaging ensures that the destination pixel values are interpolations of the two source colors. Using the method of the present invention, such an anti-aliased image can be detected by the fact that all of the color values of the image lie on a single line in 3-dimensional color space. The line in 3-dimensional color space connects the points for the two source colors. This line is considered the base color line. For simplicity, in the discussion below, we will focus on the case where the color space is RGB. However, those of skill in the art will readily recognize that the method of the present invention can easily be applied in any color space, e.g. YUV or YCbCr.

Using the method of the invention, once anti-aliasing is detected all that is needed is the information that all pixel values are a shade of a base color line connecting the two extremes, and the position on the base color line for each pixel. Recall that, in the prior art, each pixel was treated as a new color being one of $256^3$ possibilities, requiring three bytes of data per pixel. In contrast, using the present invention, all that is needed is to define end points of line, i.e., the two extreme values, which may require three bytes per endpoint, and then only a single byte is required for each pixel to convey the shade of the base color line.

In one embodiment of the invention, the double scan embodiment, the co-linearity test described above requires scanning through the image twice. During one scan, the two extremal colors are identified. This can be accomplished by combining the Red, Green, and Blue values into a single integer, e.g., for RGB values between 0 and 255, the integer can be something like 65536*Red+256*Green+Blue. During the first pass, the minimum and maximum values of the integer are found. For simplicity, we will refer herein to an anti-aliased image with two source colors as a two-color anti-aliased image. For a two-color anti-aliased image, such as simple text, these minimum and maximum values will typically correspond to the two source colors. According to this embodiment of the invention, during the second pass, each pixel is tested to see if it lies on a line connecting the two extremal (R, G, B) values. If a pixel is not consistent with the line, then, according to the present invention, the image is considered not a two-color anti-aliased image. With this embodiment of the invention, even images that are not anti-aliased will require at least one full pass through the image.

In another embodiment of the invention, a single scan through the image is used. In this embodiment, the line in RGB space is determined approximately using the two most extremal values found in the image so far. In one embodiment of the invention, the error in the parameters of the line are tracked to allow determination of whether each new RGB value is consistent with the line as measured so far. It is very unlikely that the pixel values would conspire to give a different result from the two-scan embodiment described above. This embodiment of the invention has the advantage of quickly rejecting most images that are not two-color anti-aliased.

In a third embodiment of the invention, the numbers of unique colors in an image are counted. Since, a two-color anti-aliased image is constrained to a line in RGB space, a two-color anti-aliased image would have a smaller number of unique colors than a natural image. According to this embodiment of the invention, if the measured number of unique colors exceeds a predetermined threshold value, the image is considered not two-color anti-aliased. In one embodiment of the invention, a threshold value approximately equal to 256 is used for 8-bit color. Alternatively, in other embodiments of the invention, a larger value could be used to account for rounding effects. In one embodiment of the invention, the appropriate threshold value is determined by finding the maximum number of unique colors for a good selection of two-color anti-aliased images. If the image is found to contain fewer colors than the threshold value, then one of the other embodiments of the invention can be used to verify that the (R, G, B) values actually lie on a line in RGB space.

A fourth embodiment of the invention allows detection of only the two-color anti-aliased images where one of the two colors is black and the other is white. This is an important special case since it has wide application to the majority of text images. In 8-bit color space, the black and white color values are (R, G, B)=(0, 0, 0) and (255, 255, 255). Anti-aliased black and white images will therefore lie on the line R=G=B, and, according to the present invention, images where any pixels fail this condition are rejected.

The first embodiment of the invention discussed above, i.e., the double scan embodiment, is fully general. However, one of the other embodiments may be preferred based on application-specific considerations such as CPU usage.

In most cases the invention would be applied to images with a large number of colors, typically 16 or more colors because images with less than 16 colors can be efficiently encoded using a low-color codec.

It is to be understood that both the foregoing general description and following detailed description are intended only to exemplify and explain the invention as claimed.

BRIEF DESCRIPTION OF THE DRAWINGS

The accompanying drawings, which are incorporated in, and constitute a part of, this specification, illustrate embodiments of the invention and, together with the description, serve to explain the advantages and principles of the invention. In the drawings.

DETAILED DESCRIPTION

The invention will now be described in reference to the accompanying drawings. The same or similar reference numbers may be used throughout the drawings and the following description to refer to the same or like parts.

The present invention provides a mechanism for identifying images generated by anti aliasing source images of two or three colors. The present invention is most useful in situations where a source of one of more RGB images is unknown.

One embodiment of the present invention makes use of the fact that in most anti-aliasing techniques, the color values of the source images are known with sub-pixel accuracy, e.g., the boundaries of text characters are described with arbitrary high precision. Typically, the value for a given pixel in the destination image is given by a position-weighted average of image colors in the source image, with source areas near the pixel's coordinates being given extra weight. The weighted average produces the desired blurring effect.

Figure 1:
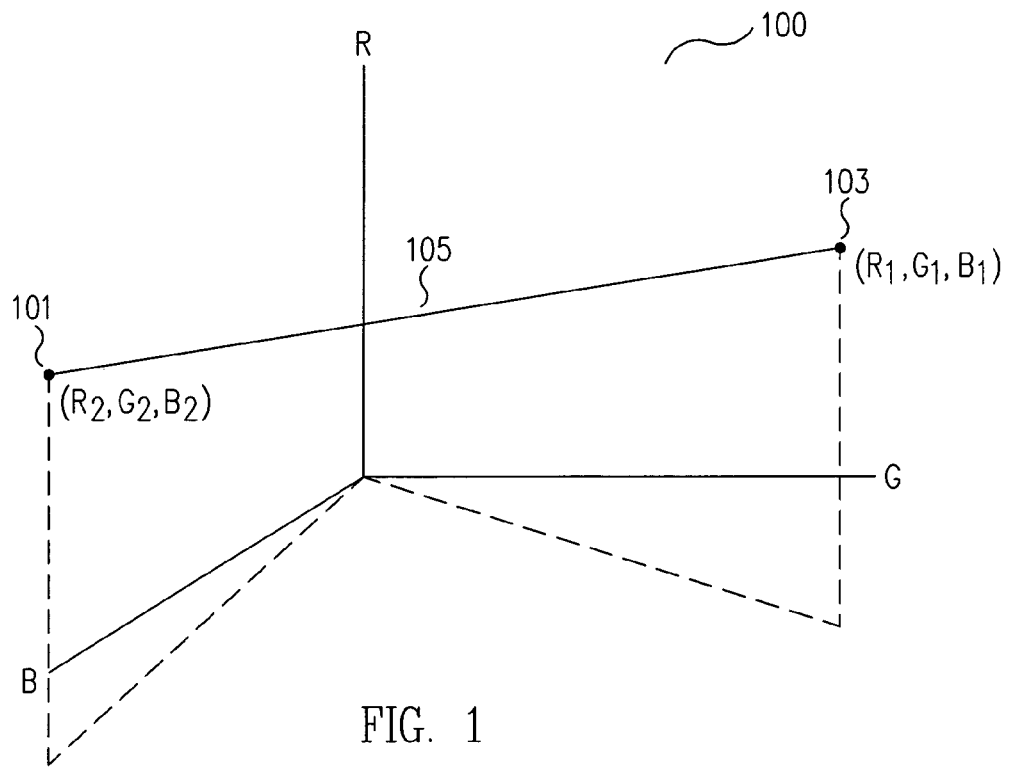
FIG. 1 is a graphical representation of the fact that a two color anti-aliased image can be detected by all of the color values of the image lying on a single line in 3-dimensional color space.

For a two-color source image such as text, the averaging ensures that the destination pixel values are interpolations of the two source colors (101 and 103 in FIG. 1). Using the method of the present invention, such an anti-aliased image can be detected by the fact that all of the color values of the image lie on a single line (105 in FIG. 1) in 3-dimensional color space. The line in 3-dimensional color space connects the points for the two source colors. For simplicity, in the discussion below, we will focus on the case where the color space is RGB. However, those of skill in the art will readily recognize that the method of the present invention can easily be applied in any color space, e.g. YUV or YCbCr.

Using the method of the invention, once anti-aliasing is detected, during compression, all that is needed is the information that all pixel values are a shade of base color line connecting the two extremes, and the position on the base color line or base color plane for each pixel. Recall that, in the prior art, each pixel was treated as a new color being one of $256^3$ possibilities, requiring three bytes of data per pixel. In contrast, using the present invention, all that is needed is to define end points of line, i.e., the two extreme values, which may require three bytes per endpoint, and then only a single byte is required for each pixel to convey the shade of the base color line.

Figure 3:
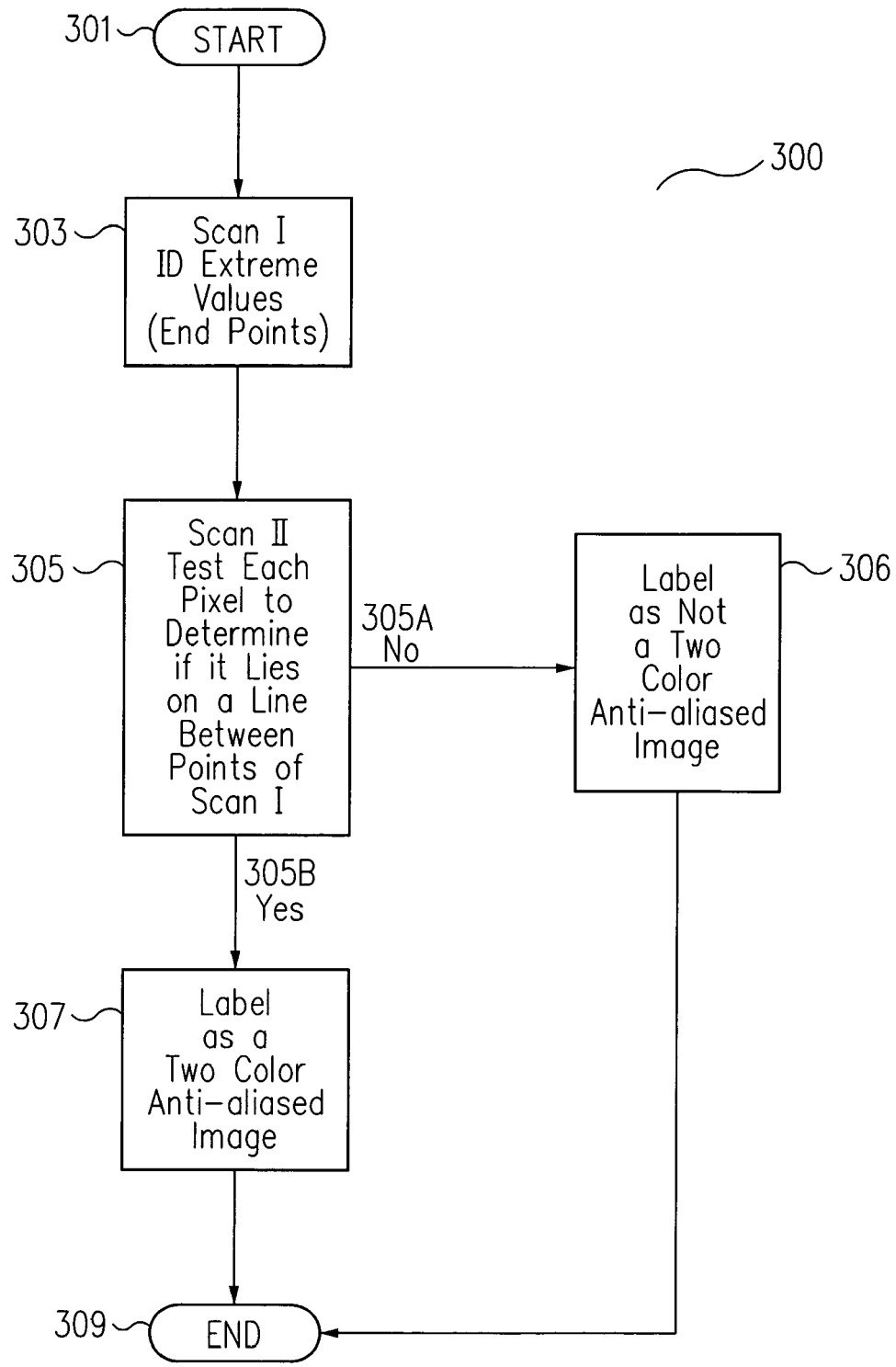
FIG. 3 shows a flow chart of one embodiment of a method for detecting two color anti-aliased source images in accordance with the principles of the invention.

In one embodiment of the invention shown in FIG. 3, the double scan embodiment, the CO-linearity test requires scanning through the image twice. During one scan, the two extremal colors are identified. This can be accomplished by combining the Red, Green, and Blue values into a single integer, e.g., for RGB values between 0 and 255, the integer can be something like 65536*Red+256*Green+Blue. During the first pass, the minimum and maximum values of the integer are found. For a two-color anti-aliased image, such as simple text, these minimum and maximum values will typically correspond to the two source colors. According to this embodiment of the invention, during the second pass, each pixel is tested to see if it lies on the line between the two extremal (R, G, B) values. If a pixel is not consistent with the line, then, according to the present invention, the image is considered not a two-color anti-aliased image. With this embodiment of the invention, even images that are not anti-aliased will require at least one full pass through the image.

Figure 4:
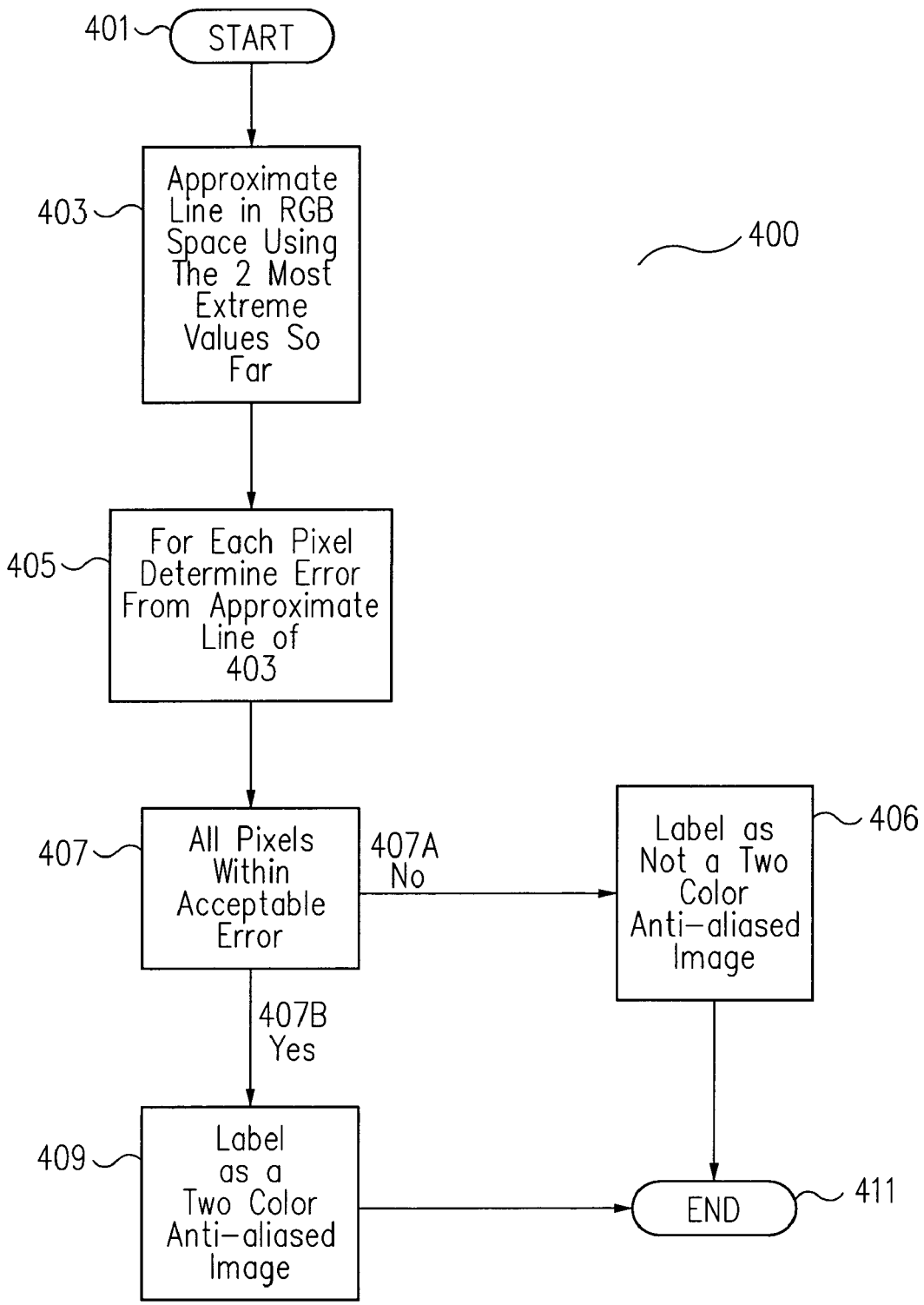
FIG. 4 shows a flow chart of another embodiment of a method for detecting two color anti-aliased source images in accordance with the principles of the invention.

In another embodiment of the invention shown in FIG. 4, a single scan through the image is used. In this embodiment, the line in RGB space is determined approximately using the two most extremal values found in the image so far. In one embodiment of the invention, the error in the parameters of the line are tracked as well to allow determination of whether each new RGB value is consistent with the line as measured so far. It is very unlikely that the pixel values would conspire to give a different result from the two-scan embodiment described above. This embodiment of the invention has the advantage of quickly rejecting most images that are not two-color anti-aliased.

Figure 5:
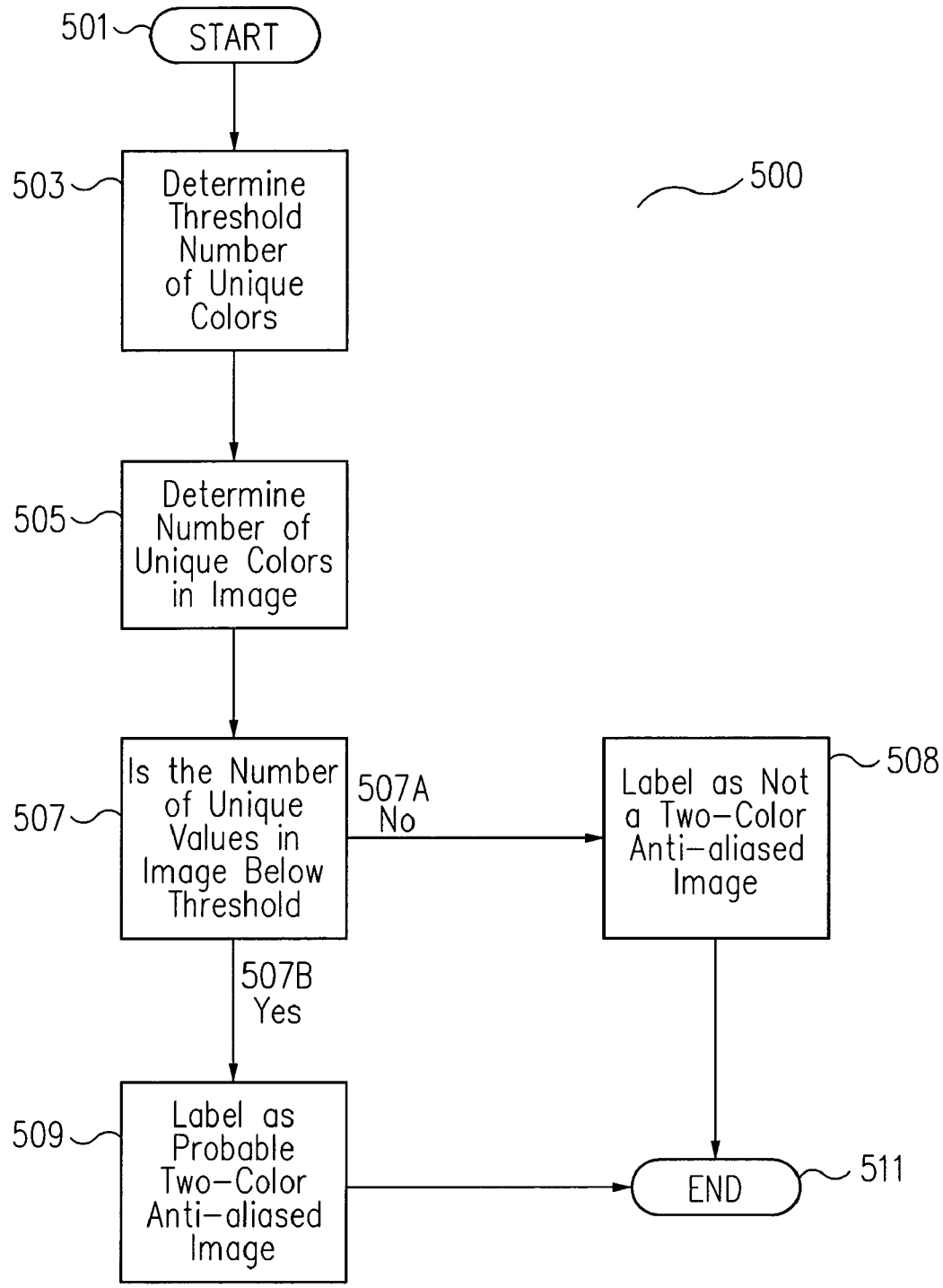
FIG. 5 shows a flow chart of another embodiment of a method for detecting two color anti-aliased source images in accordance with the principles of the invention.

In a third embodiment of the invention shown in FIG. 5, the number of unique colors in an image is counted. Since, a two-color anti-aliased image is constrained to a line in RGB space, a two-color anti-aliased image would have a smaller number of unique colors than a natural image. According to this embodiment of the invention, if the measured number of unique colors exceeds a threshold value, the image is rejected as not being two-color anti-aliased. In one embodiment of the invention, a threshold value approximately equal to 256 is used for 8-bit color. Alternatively, in other embodiments of the invention, a larger value could be used to account for rounding effects. In one embodiment of the invention, the appropriate threshold value is determined by finding the maximum number of unique colors for a good selection of two-color anti-aliased images. If the image is found to contain fewer colors than the threshold value, then one of the other embodiments of the invention can be used to verify that the (R, G, B) values actually lie on a line in RGB space.

Figure 6:
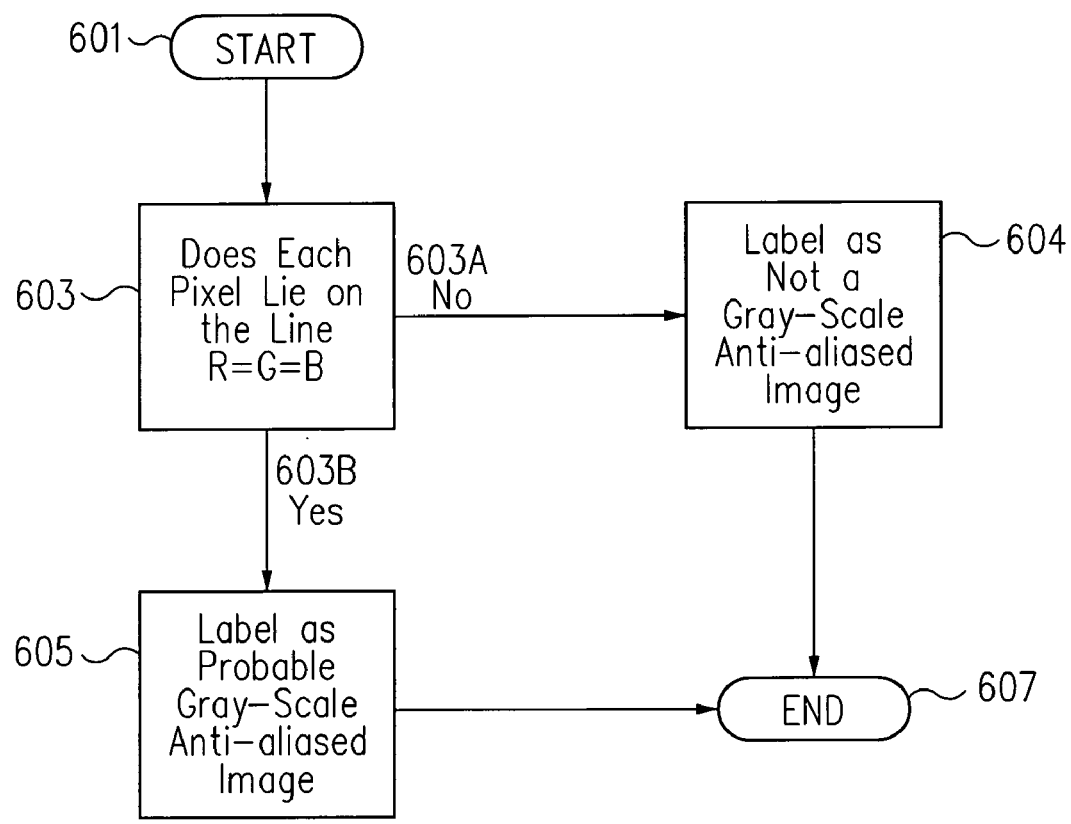
FIG. 6 shows a flow chart of one embodiment of a method for detecting black and white two color anti-aliased source images in accordance with the principles of the invention.

A fourth embodiment of the invention shown in FIG. 6 allows detection of only the two-color anti-aliased images where the two colors are shades of gray. This is an important special case since it has wide application to the majority of text images where the two shades of gray are black and white. The gray scale source colors satisfy R=G=B, for example, in 8-bit color space, the black and white color values are (R, G, B)=(0, 0, 0) and (255, 255, 255). The interpolated pixel values in the anti-aliased image will also satisfy R=G=B. Therefore, according to the present invention, images where any pixels fail this condition are rejected.

The first embodiment of the invention discussed above, i.e., the double scan embodiment is fully general. However, one of the other embodiments may be preferred based on application-specific considerations such as CPU usage.

As noted above, in most anti-aliasing techniques, the color values of the source images are known with sub-pixel accuracy, e.g., the boundaries of text characters are described with arbitrary high precision. Typically, the value for a given pixel in the destination image is given by a position-weighted average of image colors in the source image, with source areas near the pixel's coordinates being given extra weight. The weighted average produces the desired blurring effect.

FIG. 1 is a graphical representation of the fact that a two color anti-aliased image can be detected by the instance where all of the color values of the image lie on a single line 105 in 3-dimensional color space 100. For a two-color source image such as text, the averaging ensures that the destination pixel values are interpolations of the two source colors 101 and 103 having RGB space coordinates R1, G1, B1 and R2, G2, B2, respectively. Using the method of the present invention, such an anti-aliased image is detected by the fact that all of the color values of the image lie on the single line 105 in 3-dimensional color space 100. As seen in FIG. 1, line 105 in 3-dimensional color space 100 connects points 101 and 103 for the two source colors R1, G1, B1 and R2, G2, B2. For simplicity, in the discussion below, we will focus on the case where color space 100 is RGB color space. However, those of skill in the art will readily recognize that the method of the present invention can easily be applied in any color space, e.g. YUV or YCbCr.

Figure 2:
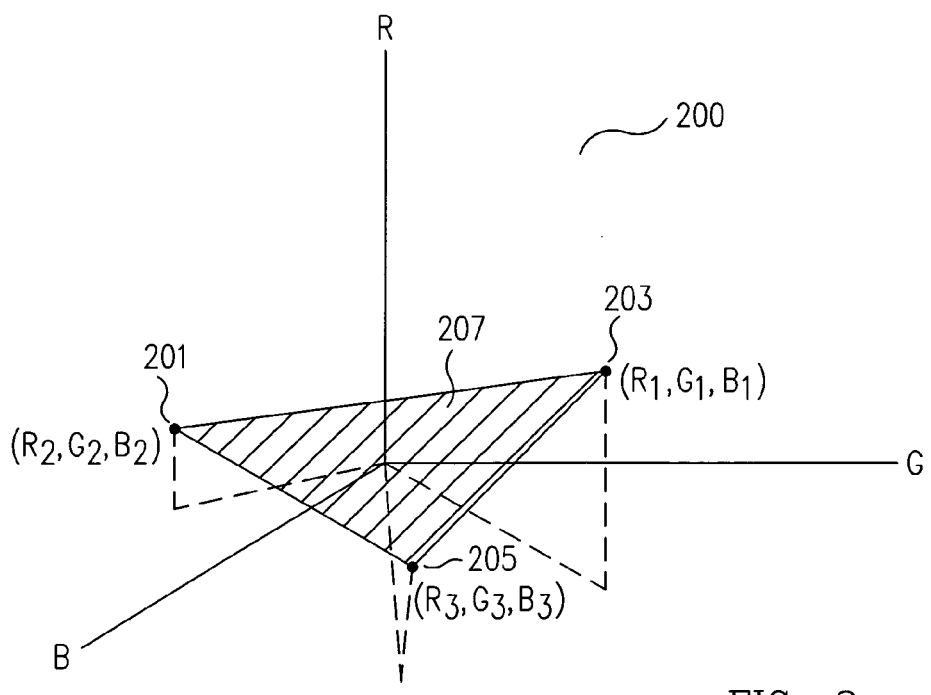
FIG. 2 is a graphical representation of the fact that a three-color anti-aliased image can be detected by all of the color values of the image lying on a single plane in 3-dimensional color space.

Similarly, FIG. 2 is a graphical representation of the fact that a three-color anti-aliased image can be detected by the fact that all of the color values of the image lie on a single plane 207 in 3-dimensional color space 200. For a three-color source image such as a corporate logo, the averaging ensures that the destination pixel values are interpolations of the three source colors 201, 203 and 205 having RGB space 200 coordinates R1, G1, B1 and R2, G2, B2 and R3, G3, B3, respectively. Using the method of the present invention, such an anti-aliased image is detected by the fact that all of the color values of the image lie on plane 207 in 3-dimensional color space 200. As seen in FIG. 2, plane 207 in 3-dimensional color space 200 is defined by points 201, 203 and 205 for the three source colors R1, G1, B1 and R2, G2, B2 and R3, G3, B3. For simplicity, in the discussion below, we will focus on the case where color space 200 is RGB color space. However, those of skill in the art will readily recognize that the method of the present invention can easily be applied in any color space, e.g. YUV or YCbCr.

FIG. 3 shows a flow chart of one embodiment of a method for detecting two color anti-aliased source images in accordance with the principles of the invention.

In the one embodiment of the invention 300 shown in FIG. 3, the double scan embodiment, the co-linearity test requires scanning through the image twice. The method starts at 301. At 303, during a first scan, the two extremal colors, represented by points 101 and 103 in FIG. 1, are identified. In one embodiment of the invention, this can be accomplished by combining the Red, Green, and Blue values into a single integer, e.g., for RGB values between 0 and 255, the integer can be something like 65536*Red+256*Green+Blue. Returning to FIG. 3, during the first scan of 303, the minimum and maximum values of the integer are found. For a two-color anti-aliased image, such as simple text, these minimum and maximum values will typically correspond to the two source colors. Alternatively, the extremal values can be chosen as those with minimal separation in RGB space, measured in either a Manhattan (R+G+B) or a Euclidian ($R^2+G^2+B^2$) sense.

According to the embodiment of the invention shown in FIG. 3, during a second scan pass at 305, each pixel is tested to see if it lies on the line between the two extremal (R, G, B) values, such as line 105 in FIG. 1. Returning to FIG. 3, at 305, if a pixel is not consistent with the line at 305A, then, according to the present invention, at 306, the image is considered not a two-color anti-aliased image and the process proceeds to end 309.

If, on the other hand, at 305B, all pixels are consistent with the line, such as line 105 in FIG. 1, then, according to the present invention, at 307, the image is designated as a two color anti-aliased image and the process proceeds to end 309.

As noted above, with this embodiment of the invention 300 shown in FIG. 3, even images that are not anti-aliased will require at least one full pass through the image.

The first embodiment of the invention discussed above, i.e., the double scan embodiment, is fully general. However, one of the other embodiments may be preferred based on application-specific considerations such as CPU usage.

FIG. 4 shows a flow chart of another embodiment of a method 400 for detecting two color anti-aliased source images in accordance with the principles of the invention. According to the embodiment of the invention shown in FIG. 4, a single scan through the image is used. The method starts at 401. In this embodiment, the line in RGB space, such as line 105 in FIG. 1, is determined approximately at 403 using the two most extremal values found in the image so far.

In this embodiment of the invention, the errors in the parameters of the line are tracked at 405 to allow determination of whether each new RGB value is consistent with the line as measured so far. At 407 a determination is made as to whether it falls within the acceptable error determined at 405. If not, for any pixel, at 407A, the image is labeled as a non-two color anti-aliased image and the process proceeds to end 411.

If, on the other hand, at 407B, it is determined that all pixels do lie within an acceptable error, then at 409 the image is considered a two-color anti-aliased image and the process proceeds to end 411.

As noted above, it is very unlikely that the pixel values in method 400 would conspire to give a different result from the two-scan embodiment 300 described above with respect to FIG. 3. The embodiment of the invention shown in FIG. 4 has the advantage of quickly rejecting most images that are not two-color anti-aliased.

FIG. 5 shows a flow chart of another embodiment of a method 500 for detecting two color anti-aliased source images in accordance with the principles of the invention. The method starts at 501. According to this embodiment of the invention, at 503 a threshold number of unique colors is determined. At 505 the number of unique colors in an image are counted.

Since, a two-color anti-aliased image is constrained to a line, such as line 105 in FIG. 1, in RGB space, a two-color anti-aliased image should have a smaller number of unique colors than a natural image. According to this embodiment of the invention, if, at 507A, the measured number of unique colors at 505 exceeds the predetermined threshold value from 503, the image is considered not two-color anti-aliased image at 508 and the process proceeds to end 511.

If, on the other hand, if, at 507B, the measured number of unique colors at 505 does not exceed the predetermined threshold value from 503, the image is considered a probable two-color anti-aliased image at 509 and the process proceeds to end 511.

In one embodiment of the invention, the threshold value of 503 approximately equal to 256 is used for 8-bit color. Alternatively, in other embodiments of the invention, a larger value could be used to account for rounding effects. In one embodiment of the invention, the appropriate threshold value of 503 is determined by finding the maximum number of unique colors for a good selection of two-color anti-aliased images. If the image is found to contain fewer colors than the threshold value, then one of the other embodiments of the invention can be used to verify that the (R, G, B) values actually lie on a line in RGB space.

FIG. 6 shows a flow chart of one embodiment of a method for detecting two color anti-aliased source images in accordance with the principles of the invention where the two colors are shades of gray. This is an important special case since it has wide application to the majority of text images where the two shades of gray are black and white. The gray scale source colors satisfy R=G=B, for example, in 8-bit color space, the black and white color values are (R, G, B)=(0, 0, 0) and (255, 255, 255). The interpolated pixel values in the anti-aliased image will also satisfy R=G=B. Therefore, according to the present invention, images where any pixels fail this condition are rejected.

The method starts at 601. At 603 it is determined if all the pixels lie on the line R=B=G. If at 603A it is determined that one or more pixels do not lie on the line R=B=G, then the image is labeled as a non-two color gray scale anti-aliased image and the process proceeds to end 607. If, on the other hand, at 603B, it is determined that all the image's pixels do lie on the line R=B=G, then the image is labeled as a two color gray scale anti-aliased image and the process proceeds to end 607.

As noted above, for a three-color source image such as a corporate logo, the averaging of anti-aliasing ensures that the destination pixel values are interpolations of the three source colors such that all of the color values of the image lie on single plane in 3-dimensional color space. As noted above, in most cases the invention would be applied to images with a large number of colors, typically 16 or more colors because images with less than 16 colors can be efficiently encoded using a low-color codec. In addition, 3-color embodiments would typically not be applied unless it has already been determined that the image is not a 2-color anti-aliased image by the methods discussed above.

As seen in FIG. 2, plane 207 in 3-dimensional color space 200 is defined by points 201, 203 and 205 for the three source colors R1, G1, B1 and R2, G2, B2 and R3, G3, B3. The present invention can therefore be expanded for use in detecting three-color anti-aliased images. For simplicity, we will refer herein to an anti-aliased image with three source colors as a three-color anti-aliased image.

Figure 7:
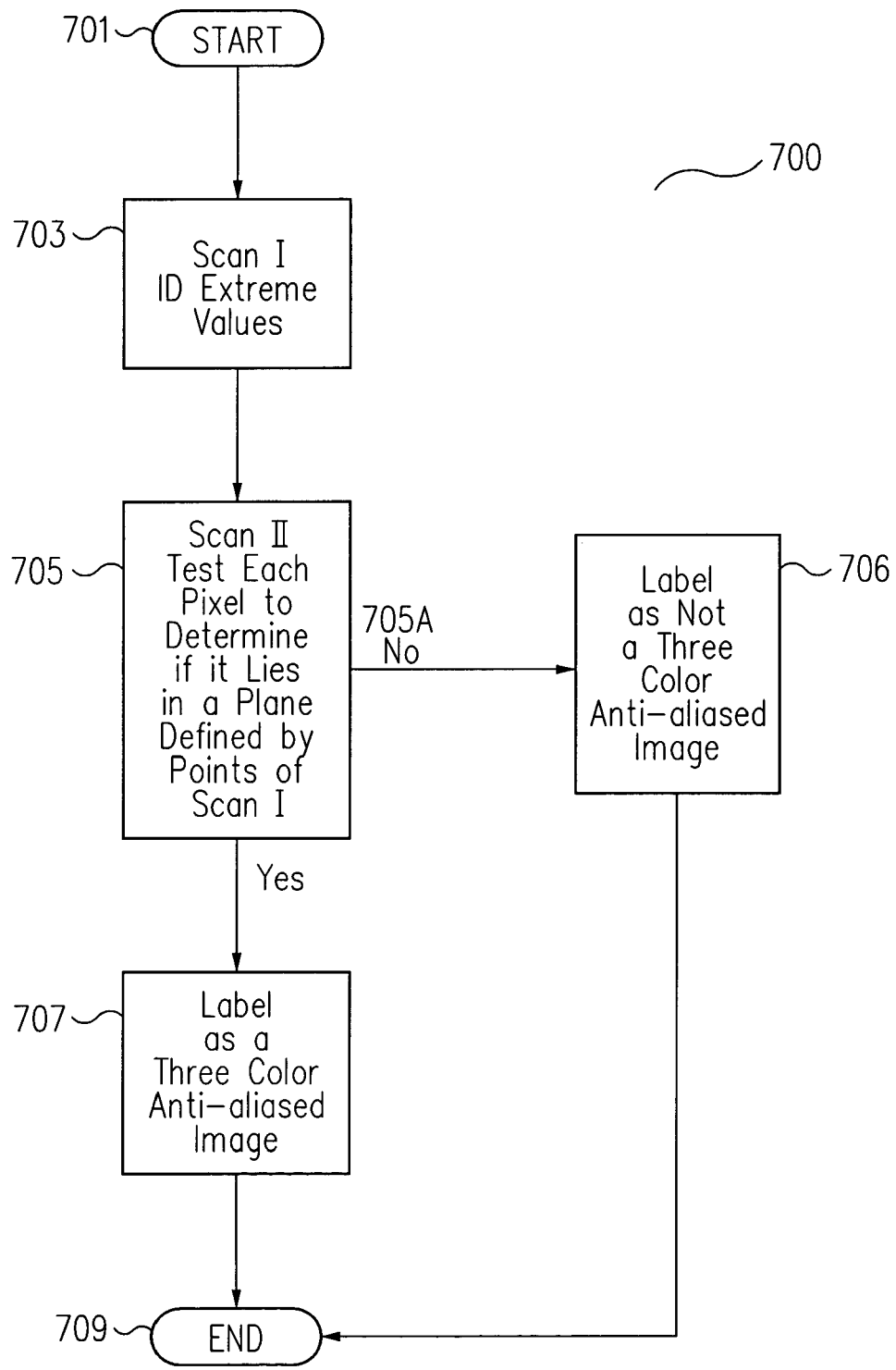
FIG. 7 shows a flow chart of one embodiment of a method for detecting three-color anti-aliased source images in accordance with the principles of the invention.

FIG. 7 shows a flow chart of one embodiment of a method for detecting three-color anti-aliased source images in accordance with the principles of the invention. In the one embodiment of the invention 700 shown in FIG. 7, the double scan embodiment, the co-planar test requires scanning through the image twice. The method starts at 701. At 703, during a first scan, the three extremal colors, represented by points 201, 203 and 205 in FIG. 2, are identified. While scanning an image, an extremal value is updated if the sum of the distances from the new pixel to the other two extrema is greater than the sum for the current extremal value. This distance can be measured using Manhattan or Euclidean rules.

According to the embodiment of the invention shown in FIG. 7, during a second scan pass at 705, each pixel is tested to see if it lies on the plane defined by the three extremal (R, G, B) values, such as plane 207 in FIG. 2. Returning to FIG. 7, at 705, if a pixel is not consistent with the plane at 705A, then, according to the present invention, at 706, the image is considered not a three-color anti-aliased image and the process proceeds to end 709.

If, on the other hand, at 705B, all pixels are consistent with the plane, such as plane 207 in FIG. 2, then, according to the present invention, at 707, the image is designated as a three-color anti-aliased image and the process proceeds to end 709.

As noted above, with this embodiment of the invention 700 shown in FIG. 7, even images that are not anti-aliased will require at least one full pass through the image.

The embodiment of the invention 700 discussed above, i.e., the double scan embodiment, is fully general. However, one of the other embodiments may be preferred based on application-specific considerations such as CPU usage.

Figure 8:
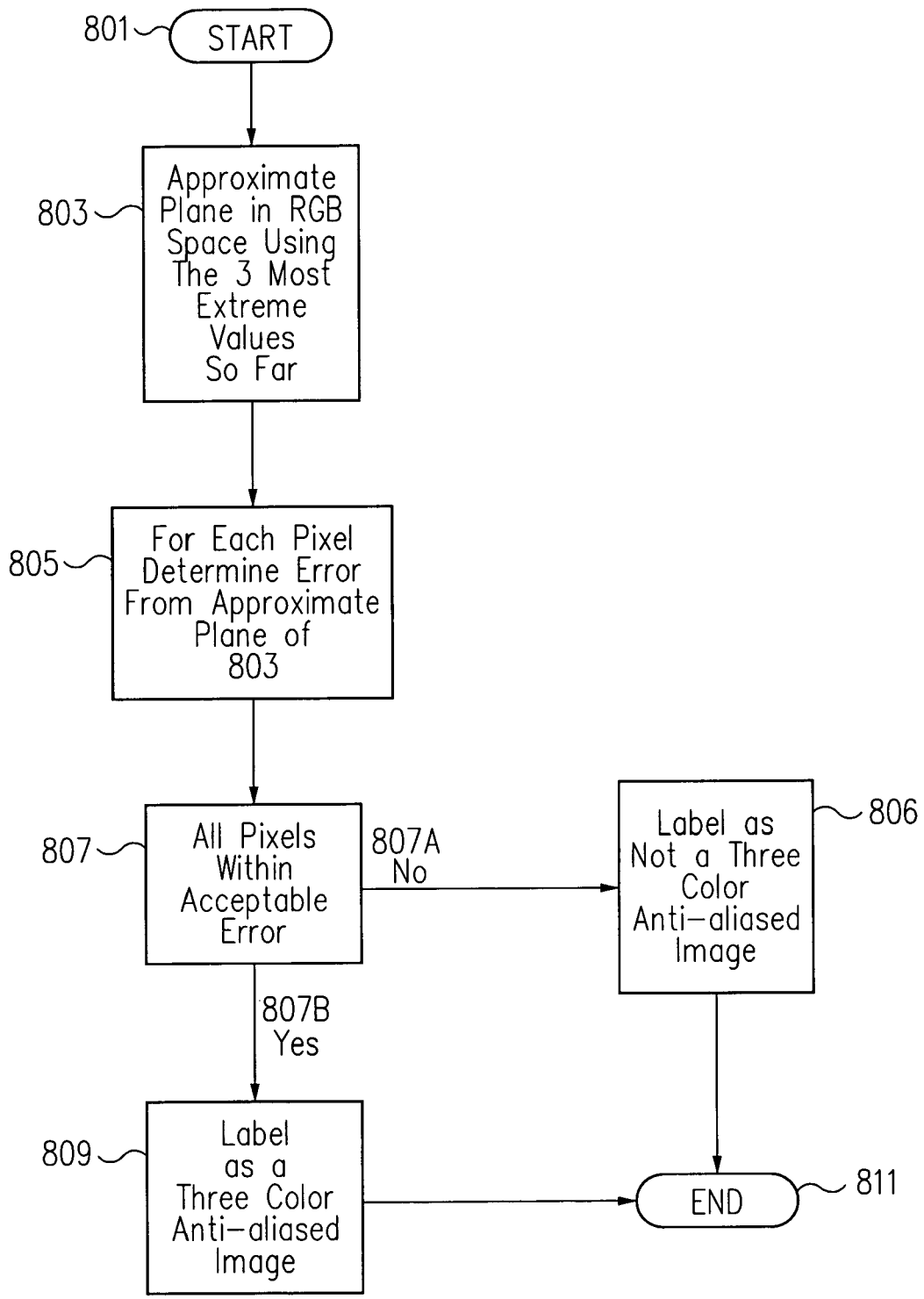
FIG. 8 shows a flow chart of another embodiment of a method for detecting three color anti-aliased source images in accordance with the principles of the invention.

FIG. 8 shows a flow chart of another embodiment of a method 800 for detecting three-color anti-aliased source images in accordance with the principles of the invention. According to the embodiment of the invention shown in FIG. 8, a single scan through the image is used. The method starts at 801. In this embodiment, the plane in RGB space, such as plane 207 in FIG. 2, is determined approximately at 803 using the three most extremal values found in the image so far.

In this embodiment of the invention, the errors in the parameters of the plane are tracked at 805 to allow determination of whether each new RGB value is consistent with the plane as measured so far. At 807 a determination is made as to whether or not all the pixels fall within the acceptable error determined at 805.

At 807 a determination is made as to whether it falls within the acceptable error determined at 805. If not, for any pixel, at 807A, the image is labeled as a non-two color anti-aliased image and the process proceeds to end 811.

If, on the other hand, at 807B, it is determined that all pixels do lie within an acceptable error, then at 809 the image is considered a three-color anti-aliased image and the process proceeds to end 811.

As noted above, it is very unlikely that the pixel values would conspire to give a different result from the two-scan embodiment 700 described above with respect to FIG. 7. The embodiment of the invention shown in FIG. 8 has the advantage of quickly rejecting most images that are not three-color anti-aliased.

Figure 9:
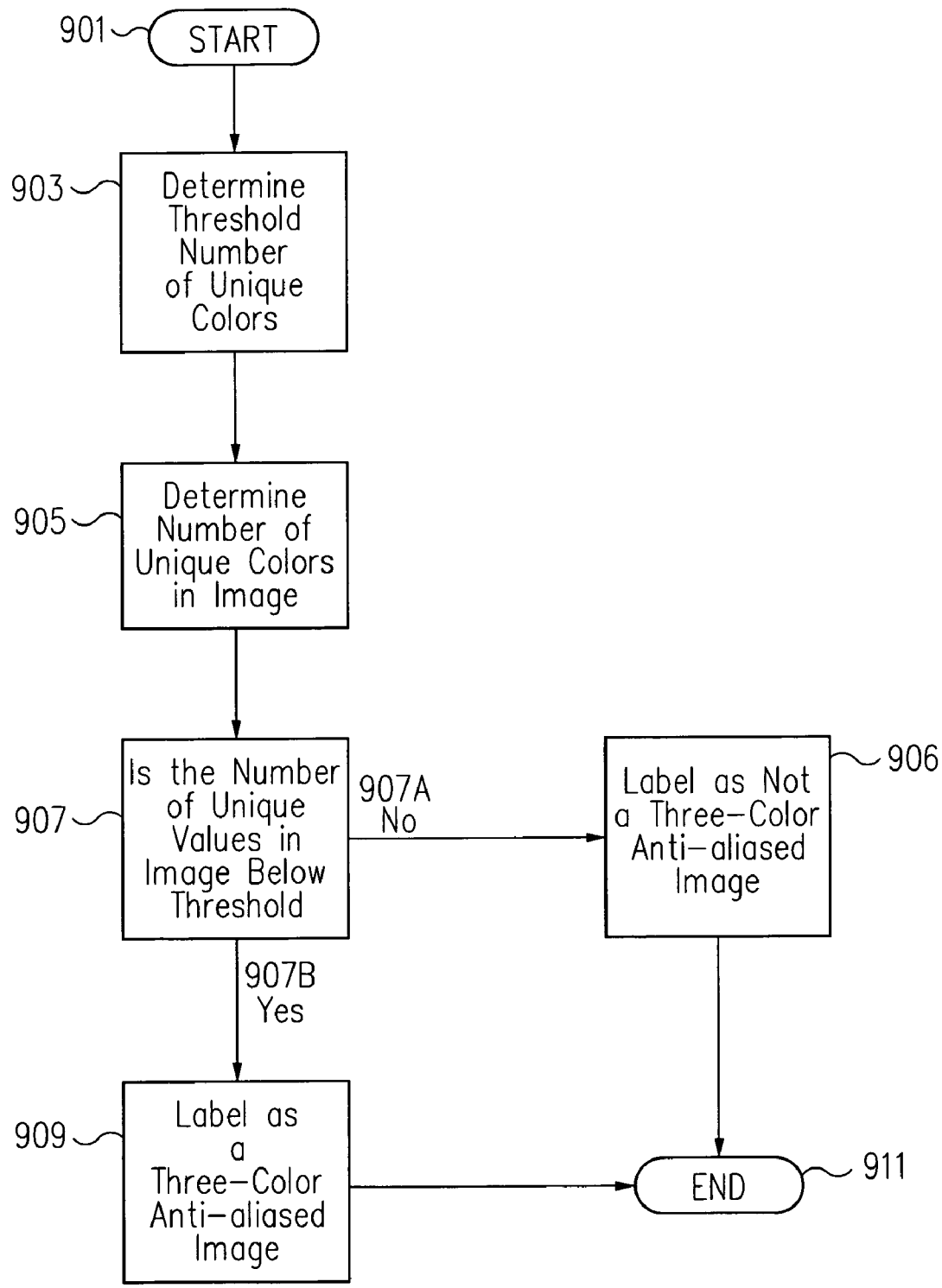
FIG. 9 shows a flow chart of another embodiment of a method for detecting three-color anti-aliased source images in accordance with the principles of the invention.

FIG. 9 shows a flow chart of another embodiment of a method for detecting three-color anti-aliased source images in accordance with the principles of the invention. The method starts at 901. According to this embodiment of the invention, at 903 a threshold number of unique colors is determined. At 905 the number of unique colors in an image are counted.

Since, a three-color anti-aliased image is constrained to a plane, such as plane 207 in FIG. 2, in RGB space, a three-color anti-aliased image should have a smaller number of unique colors than a natural image. According to this embodiment of the invention, if, at 907A, the measured number of unique colors at 905 exceeds the predetermined threshold value from 903, the image is considered not a three-color anti-aliased image at 906 and the process proceeds to end 911.

If, on the other hand, if, at 907B, the measured number of unique colors at 905 does not exceed the predetermined threshold value from 903, the image is considered a three-color anti-aliased image at 909 and the process proceeds to end 911.

In one embodiment of the invention, the threshold value of 903 approximately equal to 256×3 is used for 8-bit color, as most colors will be near the edges of the base color triangle. Alternatively, in other embodiments of the invention, a larger value could be used to account for rounding effects. In one embodiment of the invention, the appropriate threshold value of 903 is determined by finding the maximum number of unique colors for a good selection of three-color anti-aliased images. If the image is found to contain fewer colors than the threshold value, then one of the other embodiments of the invention can be used to verify that the (R, G, B) values actually lie on a plane in RGB space.

As discussed above, the present invention provides a method of identifying anti-aliased images and then compressing the anti-aliased images more efficiently than was possible using prior art methods and encoders.

For instance, an anti-aliased text image may contain base colors of black and white, with all other color variations being shades of gray. Consequently, during compression, all that is needed is the information that all pixel values are a shade of gray, and the position on the base color line or base color plane for each pixel. However, in the prior art, each pixel was treated as a new color being one of 256^3 possibilities, requiring three bytes of data per pixel. Consequently, in the prior art, for a given degree of lossiness, the encoder often obtained the same, or even worse, compression for an anti-aliased image as it would for a true many color natural image.

In contrast, one embodiment of the present invention makes use of the fact that in most anti-aliasing techniques the color values of the source images are known with sub-pixel accuracy, e.g., the boundaries of text characters are described with arbitrary high precision. Typically, the value for a given pixel in the destination image is given by a position-weighted average of image colors in the source image, with source areas near the pixel's coordinates being given extra weight. The weighted average produces the desired blurring of softening effect discussed above.

Using the method of the invention, once anti-aliasing is detected, during compression, all that is needed is the information that all pixel values are a shade of base color line, or base color plane, color connecting the two or three extremes, and the position on the base color line or base color plane for each pixel. Consequently, the present invention represents a significant improvement over prior art compression methods.

The foregoing description of an implementation of the invention has been presented for purposes of illustration and description only, and therefore is not exhaustive and does not limit the invention to the precise form disclosed. Modifications and variations are possible in light of the above teachings or may be acquired from practicing the invention.

For instance, as noted above, for simplicity, in the discussion above focused on the case where the color space is RGB. However, those of skill in the art will readily recognize that the method of the present invention can easily be applied in any color space, e.g. YUV or YCbCr. Consequently, the scope of the invention is defined by the claims and their equivalents.

We claim:

1. A method for detecting anti-aliasing images comprising:
    determining two extremal colors present in a two-color image in a color space;
    determining a line in said color space connecting the two extremal colors present in said image;
    testing each pixel in said image to determine if each pixel lies on, or within an error margin, of said line in said color space;
    if any pixel lies outside said error margin, determining that said image is not a two-color anti-aliased image;
    compressing data representing said image as data representing a non-two-color anti-aliased image;
    transmitting said data representing said image;
    de-compressing said data representing said image; and
    displaying said image on a display screen of a display device.

2. The method for detecting anti-aliasing images of claim 1, wherein;
    said color space is RGB space.

3. The method for detecting anti-aliasing images of claim 1, wherein;
   said color space is YUV space.

4. The method for detecting anti-aliasing images of claim 1, wherein;
   said color space is YCbCr space.

5. A method for detecting anti-aliasing images comprising:
   performing a first scan of pixels in a two-color image and determining two extremal colors of said two-color image;
   performing a second scan of said pixels in said two-color image and determining if each pixel lies on the line connecting said two extremal colors in color space;
   if any pixel does not lie on said line connecting said two extremal colors then determining that said image is not a two-color anti-aliased image;
   compressing data representing said image as data representing a non-two-color anti-aliased image;
   transmitting said data representing said image;
   de-compressing said data representing said image; and
   displaying said image on a display screen of a display device.

6. The method for detecting anti-aliasing images of claim 5, wherein;
   said color space is RGB space.

7. The method for detecting anti-aliasing images of claim 5, wherein;
   said color space is YUV space.

8. The method for detecting anti-aliasing images of claim 5, wherein;
   said color space is YCbCr space.

9. A method for detecting anti-aliasing images comprising:
   determining a line in color space using the two most extremal values found in the image so far;
   checking each pixel in said image to determine if it lies within an error margin of said line in color space;
   determining whether or not all the pixels fall within said error margin;
   if any pixel in said image does not lie within said error margin, determining that said image is not a two-color anti-aliased image;
   compressing data representing said image as data representing a non-two-color anti-aliased image;
   transmitting said data representing said image;
   de-compressing said data representing said image; and
   displaying said image on a display screen of a display device.

10. The method for detecting anti-aliasing images of claim 9, wherein;
    said color space is RGB space.

11. The method for detecting anti-aliasing images of claim 9, wherein;
    said color space is YUV space.

12. The method for detecting anti-aliasing images of claim 9, wherein;
    said color space is YCbCr space.

* * * * *